Patented Apr. 12, 1932

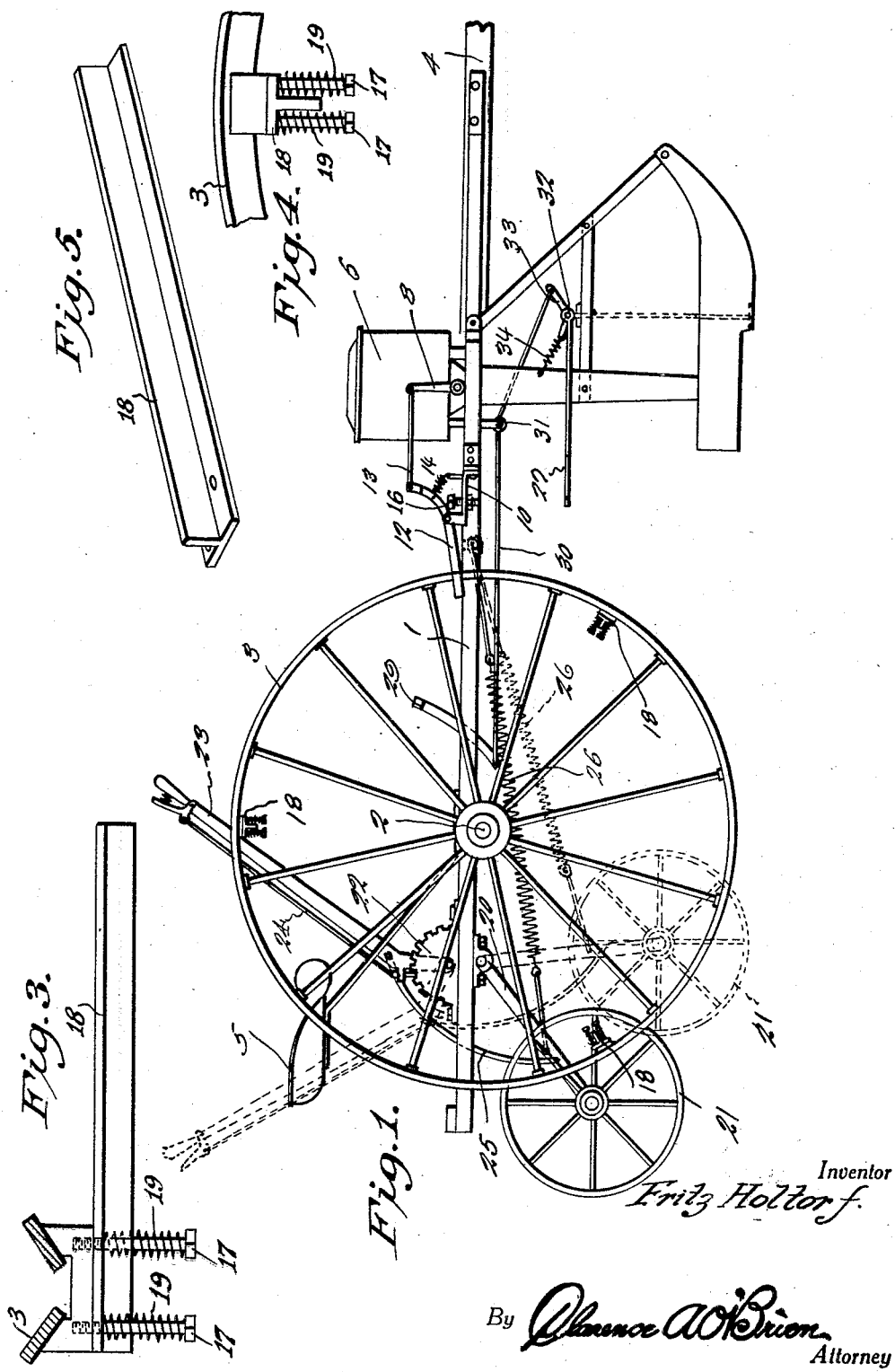

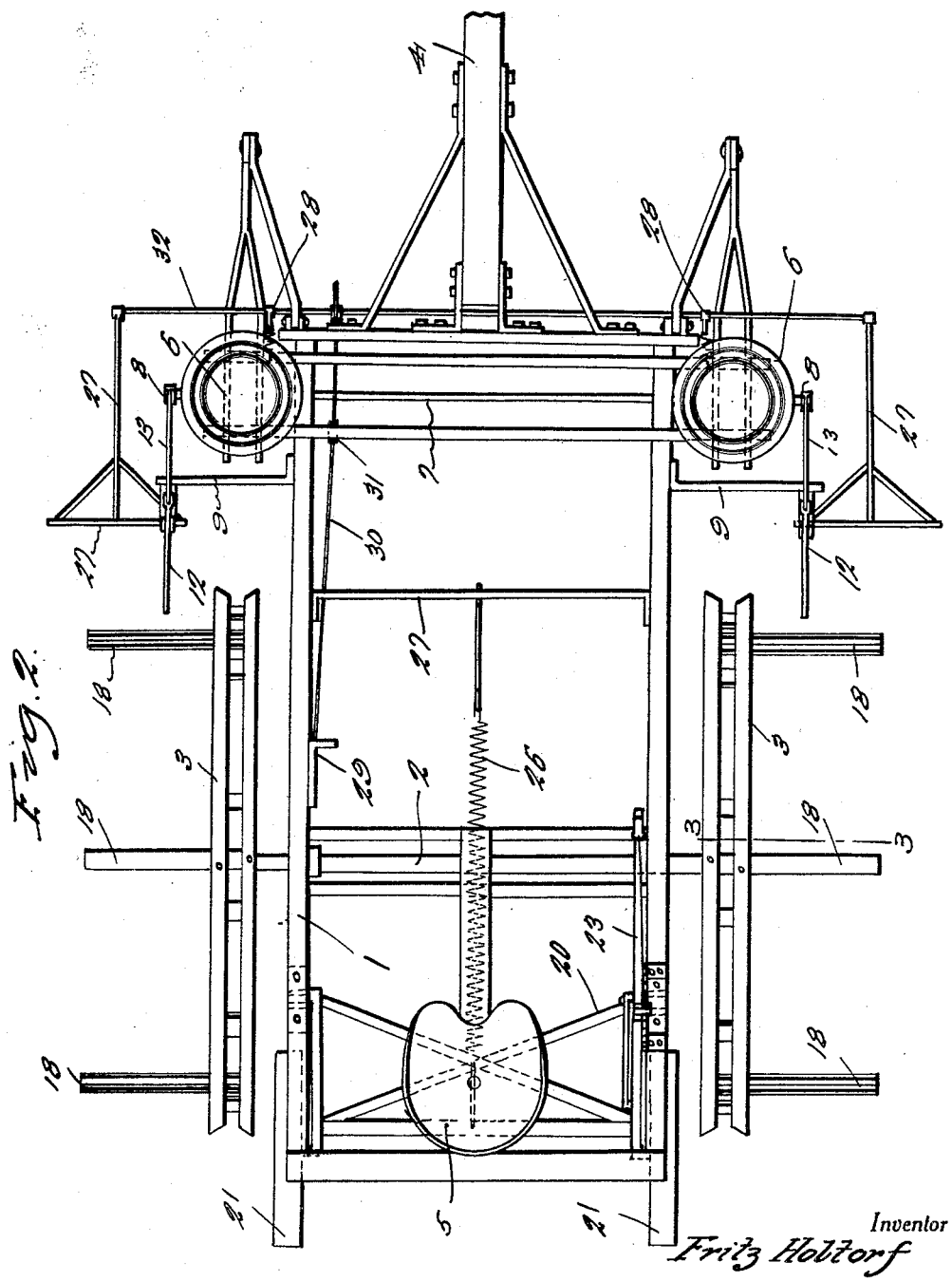

1,853,274

UNITED STATES PATENT OFFICE

FRITZ HOLTORF, OF CENTRAL CITY, NEBRASKA

CORN PLANTER

Application filed August 5, 1930. Serial No. 473,137.

This invention relates to new and useful improvements in corn planters and has for its primary object to provide, in a manner as hereinafter set forth, an agricultural machine of this character embodying novel means for dropping the seed without the use of a check wire which is the practice in widespread use at present.

Other objects of the invention are to provide a corn planter of the character described which will be comparatively simple in construction, strong, durable, highly efficient in operation and which may be manufactured at comparatively low cost.

With all of the foregoing still further objects and advantages of the invention may become apparent from a study of the following specification, taken in connection with the accompanying drawings wherein like characters of reference designate corresponding parts throughout the several views, and wherein:

Figure 1 is a view in side elevation of a corn planter constructed in accordance with this invention.

Figure 2 is a top plan view thereof.

Figure 3 is a detail view in section taken substantially on the line 3—3 of Figure 2.

Figure 4 is a fragmentary detail view showing a portion of one of the wheels with the lever actuating arm projecting therefrom.

Figure 5 is a detail perspective view of one of the actuating arms which are mounted on the wheels.

Referring to the drawings in detail, it will be seen that the reference numeral 1 designates a frame of appropriate construction beneath an intermediate portion of which is mounted for rotation the transversely extending axle 2 upon the opposite end portions of which the wheels 3 are fixed. A draft tongue 4 extends forwardly from the frame 1.

Also mounted on the rear portion of the frame 1 is an operator's seat 5. Mounted on the forward portion of the frame 1 in the usual manner is a pair of hoppers 6 having the usual seed depositing mechanism therein (not shown) which is operable by the rocker shaft 7 extending therebeneath, said rocker shaft having fixed on its opposite end portions the upstanding arms 8.

A pair of arms 9 project laterally from opposite sides of the frame 1 rearwardly of the hoppers 6 and has bolted on their free end portions, the rearwardly extending brackets 10 having upstanding apertured ears 11 on their free end portions between which the longitudinally curved operating levers 12 are pivotally mounted at an intermediate point.

As clearly seen in Figure 1 of the drawings, those portions of the levers 12 which are disposed forwardly of the pivot points of said levers curve upwardly and are coupled to the upstanding arms 8 by the links 13. A coil spring 14 is provided for each of the levers 12 and has one end anchored thereto and its opposite end anchored to the brackets 10 for yieldingly maintaining said levers in operative position.

A stop member 16 is threaded for adjustment into each of the brackets 10 for engagement with the respective levers 12 in a manner to limit the swinging movement thereof under the impulse of the coil springs 14.

Pairs of headed bolts 17 are mounted in circumferentially spaced relation on the inner periphery of each of the wheels 3 and project inwardly therefrom. Slidably mounted on each pair of the bolts 17 is an outwardly projecting lever operating arm 18 which is preferably of substantially T-shaped cross section.

Coil springs 19 are mounted on the bolts 17 and have one end engaged with the heads thereon and their opposite ends engaged with the arms 18 in a manner to yieldingly maintain said arms against the inner periphery of the wheels. The frame structure 20 is mounted for swinging movement on a rear portion of the main frame 1 and has journalled for rotation thereon the wheels 21. A toothed segment 22 is mounted on the frame 1 at one side thereof and above the swingable frame 20.

Mounted for swinging movement on the segment 22 is a hand operated lever 23 which is secured in adjusted position against swinging movement through the medium of a suitable latch mechanism 24 engageable with said segment 22.

The lever 23 is operatively connected through the swingable frame 20 through the medium of the arcuate rod 25. Coil spring 26 has one end connected to the swingable frame 20 and its opposite end connected to the cross bar 27, extending between an intermediate portion of the side members of the main frame 1.

The coil spring 26 yieldingly pulls the swingable frame 20 forwardly in a manner to engage the wheels 21 with the ground. A marker 27 is pivotally mounted for swinging movement as at 28 on the forward portion of the planter and said marker is operatively connected to the foot lever 29 on the frame 1 through the medium of the cable 30 which is trained over the pulley 31.

As best seen in Figure 2 of the drawings, a pair of the markers 27 is provided, same being mounted on the opposite end portions of the transverse rockable shaft 32 having the arm 33 fixed on an intermediate portion thereof and to the free end portion of which arm the cable 30 is connected.

The markers 27 are normally maintained in raised or inoperative position through the medium of the coil springs 34. In operation, when the planter is moved over the ground, the wheels 3, being fixed to the opposite ends of the axle 2 will rotate in unison and the operating arms 18 thereon will successively engage the adjacent end portions of the levers 12 in a manner to swing the forward ends of said levers upwardly and rearwardly and rock the shaft 7 through the medium of the arms 8 and the connecting links 13.

As before stated, the shaft 7 when rocked, operates the seed depositing mechanism in the usual manner. The mounting of the arms 18 on the bolts 17 on the wheels 3 permits said arms to move inwardly when same come into contact with a protuberance on the ground, such as a rock. In this manner, damage to the arms from this source is avoided.

When turning around the operator swings the lever 23 rearwardly in a manner to swing the frame 20 forwardly through the medium of the rod 25 and to engage the wheels 21 with the ground and a continued forward movement of the swingable frame 20 will result in elevating the wheels 3 out of engagement with the ground.

The operative position of the wheels 21 is clearly illustrated in broken lines in Figure 1 of the drawings. The wheels 21 also constitute means for moving the planter from place to place when not planting.

It is believed that the many advantages of a corn planter constructed in accordance with this invention will be readily understood, although the preferred embodiment of the invention is as illustrated and described, it is to be understood that changes in the details of construction may be had which will fall within the scope of the invention as claimed.

What is claimed is:

A planter having supporting wheels and seed depositing mechanism, groups of spaced, parallel headed bolts anchored in the fellies of the wheels and extending inwardly therefrom, arms slidably mounted on the groups of bolts and projecting laterally from the wheels, springs encircling the bolts and having one end engaged with the bolt heads and their other ends engaged with the arms for yieldingly urging said arms toward the fellies, and means for operating the seed depositing mechanism disposed in the path of the arms for engagement and actuation thereby.

In testimony whereof I affix my signature.

FRITZ HOLTORF.